(12) United States Patent
Burlot

(10) Patent No.: US 10,059,011 B2
(45) Date of Patent: Aug. 28, 2018

(54) DEVICE FOR GUIDING AT LEAST ONE LINE OF AN ARTICULATED-ARM ROBOT, AND ARTICULATED ARM ROBOT

(71) Applicant: LEONI KABEL HOLDING GMBH, Nuremberg (DE)

(72) Inventor: Claude Burlot, Bullion (FR)

(73) Assignee: LEONI Kabel Holding GmbH, Nuremberg (DE)

( * ) Notice: Subject to any disclaimer, the term of this patent is extended or adjusted under 35 U.S.C. 154(b) by 334 days.

(21) Appl. No.: 14/803,715

(22) Filed: Jul. 20, 2015

(65) Prior Publication Data

US 2015/0328780 A1    Nov. 19, 2015

Related U.S. Application Data

(63) Continuation of application No. PCT/EP2014/050869, filed on Jan. 17, 2014.

(60) Provisional application No. 61/754,214, filed on Jan. 18, 2013.

(30) Foreign Application Priority Data

Jan. 18, 2013 (FR) ..................................... 13 50467

(51) Int. Cl.
*B25J 19/00* (2006.01)
*H02G 11/00* (2006.01)
*H02G 3/32* (2006.01)

(52) U.S. Cl.
CPC ........ *B25J 19/0025* (2013.01); *H02G 11/003* (2013.01); *H02G 3/32* (2013.01); *Y10T 74/20311* (2015.01)

(58) Field of Classification Search
CPC .......................... B25J 19/0025; H02G 11/003
See application file for complete search history.

(56) References Cited

U.S. PATENT DOCUMENTS

| | | | | |
|---|---|---|---|---|
| 5,437,207 A | * | 8/1995 | Zimmer | B23K 11/318 414/918 |
| 5,651,519 A | * | 7/1997 | Goodrich | B25J 19/0025 248/51 |
| 6,431,018 B1 | | 8/2002 | Okada et al. | |

(Continued)

FOREIGN PATENT DOCUMENTS

| CN | 1666847 A | 9/2005 |
|---|---|---|
| CN | 101365566 A | 2/2009 |

(Continued)

*Primary Examiner* — Terence Boes
(74) *Attorney, Agent, or Firm* — Laurence A. Greenberg; Werner H. Stemer; Ralph E. Locher

(57) ABSTRACT

In order for a suitable restoring force to be exerted in a device for guiding at least one line of an articulated-arm robot, a restoring mechanism for exerting an elastic restoring force is provided. The restoring mechanism includes a guide unit and a slider element which is displaceably mounted on the guide unit. An elastic restoring unit, which has at least one deflection element, which is preferably configured as a deflection roller, and a flexural strand-shaped connection element, is disposed between the slider element and the guide unit. The restoring mechanism is housed in a closed housing and the line is connected to a slider element of the restoring unit inside the housing through one or two longitudinal slots.

19 Claims, 5 Drawing Sheets

(56) References Cited

U.S. PATENT DOCUMENTS

| | | | |
|---|---|---|---|
| 6,684,731 B1 * | 2/2004 | Karlinger | B25J 19/0025 248/51 |
| 6,811,124 B2 * | 11/2004 | Karlinger | B25J 19/0025 248/49 |
| 7,810,764 B2 | 10/2010 | Burlot | |
| 7,810,765 B2 * | 10/2010 | Burlot | B25J 19/0025 248/75 |
| 8,117,939 B2 * | 2/2012 | Burlot | B25J 19/0025 74/490.02 |
| 2005/0199601 A1 | 9/2005 | Inoue et al. | |
| 2009/0166478 A1 * | 7/2009 | Choi | B25J 19/0025 248/51 |
| 2012/0275571 A1 | 11/2012 | Neuber | |

FOREIGN PATENT DOCUMENTS

| | | |
|---|---|---|
| CN | 102278419 A | 12/2011 |
| CN | 102463575 A | 5/2012 |
| DE | 20113742 U1 | 11/2001 |
| DE | 102009037517 A1 | 3/2011 |
| EP | 1083030 A2 | 3/2001 |
| EP | 1848571 B1 | 10/2007 |
| JP | H03103193 U | 10/1991 |
| JP | 2002067828 A | 3/2002 |
| JP | 2002086381 A | 3/2002 |
| JP | 2005254404 A | 9/2005 |
| JP | 2008528305 A | 7/2008 |
| JP | 2009531189 A | 9/2009 |
| JP | 2010504861 A | 2/2010 |
| JP | 2011025081 A | 2/2011 |
| JP | 2012161903 A | 8/2012 |
| KR | 200395697 Y1 | 9/2005 |
| KR | 20110020640 A | 3/2011 |
| WO | 2005123350 A1 | 12/2005 |
| WO | 2009068239 A1 | 6/2009 |

* cited by examiner

DEVICE FOR GUIDING AT LEAST ONE LINE OF AN ARTICULATED-ARM ROBOT, AND ARTICULATED ARM ROBOT

CROSS-REFERENCE TO RELATED APPLICATION

This application is a continuation, under 35 U.S.C. § 120, of copending international application No. PCT/EP2014/050869, filed Jan. 17, 2014, which designated the United States; this application also claims the priority, under 35 U.S.C. § 119(a), of French patent application No. FR 1350467, filed Jan. 18, 2013, and the benefit, under 35 U.S.C. § 119(e) of provisional patent application No. 61/754,214, filed Jan. 18, 2013; the prior applications are herewith incorporated by reference in their entirety.

BACKGROUND OF THE INVENTION

Field of the Invention

The invention relates to a device for guiding at least one line of an articulated-arm robot, in particular for guiding a hose pack of an industrial robot, having the features as described. The invention furthermore relates to an articulated-arm robot having such a device.

Such a device is described, by way of example, in Japanese published patent application JP 2012 161903 A (also: WO 2012/108226 A1), for example.

In the multi-axis industrial robots which are usually employed nowadays, the forward-most robotic arm, also referred to as a robotic hand, is infed a plurality of individual lines for supply of a tool, for example a welding tool, which is disposed on the robotic hand. The individual lines are, for example, electrical supply lines, electrical control lines, data cables, and media routings for gases or fluids. These individual lines are assembled to form a so-called hose pack and are held in a hose-shaped protective jacket. On account of the relative movements of the robotic arms in relation to one another, on the one hand, and in particular also on account of the often adverse environmental conditions (high temperatures, aggressive media, such as weld spatters, etc.), a hose pack of this type is exposed to high stress.

In order for reliable guiding of the hose pack to be enabled, a line-guiding installation, which is conceived in such a manner that a compensating movement of the hose pack is enabled in the event of relative movement between two robotic arms, is usually employed. A line-guiding installation in an industrial robot is described in the commonly assigned German utility model DE 201 13 742 U1, for example.

Japanese published patent application JP 2012 161903 A describes a device in which a slider element which is held so as to be longitudinally displaceable on a guide rail is disposed within a carrier element. A clamp, which protrudes through an upper longitudinal opening of the carrier element and which holds a hose pack, is fastened to the slider element. Moreover, the entire device is disposed so as to be rotatable about a robotic arm, such that both a rotation movement as well as a longitudinal movement are enabled.

Furthermore, my earlier, commonly assigned U.S. Pat. No. 8,117,939 B2 and its counterpart European patent EP 1 848 571 B1 describe a device which has a guide unit and a slider element which is mounted on the guide unit so as to be longitudinally displaceable by means of rods in relation to the guide unit between a first and a second position. Furthermore, an elastic restoring unit, which is configured as a helical spring and which exerts an elastic restoring force on the slide element, is provided.

In devices of this type, for reasons of space a design which requires as little installation space as possible is often aspired to; but at the same time compensation lengths which are as large as possible are to be implemented. In order for these requirements which are initially contradictory to be implemented, a device in which the entire hose pack is deflected within the device is disclosed, for example, in each case in the commonly assigned published international patent application WO 2009/068239 A1 or WO 2005/123350 A1 (corresponding to my U.S. Pat. No. 7,810,764 B2).

In the case of devices with a small installation space there is furthermore the issue of a sufficiently high restoring force having to be exerted in particular also in the retracted end position, so as to ensure reliable recovery of the hose pack into this retracted end position. This means that the elastic restoring unit has to be adjusted with a comparatively high bias load which determines the restoring force in the retracted position. The elastic restoring units, such as helical springs, for example, here are typically subjected to Hooke's law, the restoring force thus increasing in a linear manner as the path increases. In the case of short installation lengths and a high required restoring force in the retracted position, this means that a comparatively high spring stiffness is required, which leads to the force very greatly increasing in an undesirable manner during extension.

SUMMARY OF THE INVENTION

It is accordingly an object of the invention to provide a line guide for an articulated-arm robot which overcomes the above-mentioned and other disadvantages of the heretofore-known devices and methods of this general type and which provides for an improved such device for an articulated-arm robot, in particular a hose pack of an industrial robot, and also for an articulated-arm robot, in particular an industrial robot.

With the foregoing and other objects in view there is provided, in accordance with the invention, a device for guiding at least one line of an articulated-arm robot, comprising:

a restoring mechanism for exerting a restoring force on the line, the restoring mechanism having a guide unit and a slider element displaceably held on the guide unit between a first position and a second position, and having a restoring unit disposed so as to be effective between the guide unit and the slider element and configured to exert a restoring force on the slider element;

the restoring unit having at least one deflection element and a flexural strand-shaped connection element guided around the deflection element and connected to the slider element.

In a preferred embodiment of the invention, the device has a restoring mechanism which is encapsulated in a housing which has a slot-shaped opening which extends in the longitudinal direction and by way of which a fastening element for fastening the at least one line, that is to say in particular the hose pack, is connected to the slider element which is disposed within the housing. The fastening element is displaceable on or within this slot-shaped opening. On account thereof, a very compact design is enabled overall with simultaneous protection of the restoring mechanism.

In contrast with the variants of embodiment such as disclosed in the above-noted WO 2009/068239 A1 or U.S. Pat. No. 7,810,764 B2 (DE 10 2004 028 577 A1), for example, the hose pack per se is therefore no longer guided into the housing. Rather, the restoring mechanism is inserted in a protected manner in a separate housing, so as to be delinked from the hose pack. The connection is effected merely by way of a slot-shaped opening on which the fastening element travels along.

The housing here has two slot-shaped openings which lie opposite one another, and the fastening element has a bracket having two bracket arms which lie opposite one another and which in each case reach into the housing by way of the two openings. On account thereof, reliable guiding of the hose pack is achieved, in particular without tilting momentums being introduced into the restoring mechanism.

The housing expediently comprises a base plate as a base, and a housing cover which completely covers the restoring mechanism which is attached to the base plate. Therefore, the entire restoring mechanism is covered by the housing cover.

Preferably, the bracket here engages on the housing cover in the fashion of a U-arm or C-arm, for instance, wherein a clamp for fixing the at least one line, in particular the hose pack, is expediently disposed in the center of the bracket, that is to say on top of the housing cover.

Preferably, the restoring mechanism has a guide unit and a slider element which is held on the guide unit so as to be displaceable between a first and a second position. In particular, the fastening element for fixing the line is connected to the slider element. Furthermore, an in particular elastic restoring unit which is disposed so as to be effective between the guide unit and the slider element, that is to say exerts a restoring force on the slider element, is disposed. The elastic restoring unit comprises a deflection element which is preferably held on the guide unit, and a flexural strand-shaped connection element which is guided around the deflection element and is connected to the slider element. The elastic restoring force is exerted on the slider element by way of this flexural strand-shaped connection element.

A flexural strand-shaped connection element is initially understood to include all elements which permit deflection around the deflection element, in particular by 180°, and which moreover are suitable for transmitting the required forces in an industrial robot. This strand-shaped connection element includes in particular rope-type, tape-type, or else belt-type elements. An elastic restoring unit is understood to be a unit or functional group which exerts an elastic restoring force on the slider element. A slider element is understood to be a guiding or sliding element in general, which guides the fastening element for the line along a predefined track and is connected to the restoring unit for transmitting the restoring force to the fastening element. In particular, the slider element is configured in the fashion of a guided slider.

On account of the disposal of the flexural strand-shaped connection element and the deflection thereof, suitable adjustment of the restoring force is enabled with a compact construction design. On account of the deflection, the readjustment path for the elastic restoring unit is altogether increased, such that a type of gearing between the actual readjustment movement of the hose pack and the readjustment movement of the elastic restoring element is therefore implemented. On account thereof, the adjustment of a sufficient restoring force in the retracted position, on the one hand, and simultaneously a restoring force which is not excessive in the extended position, are readily enabled. Therefore, a suitable spring stiffness of the elastic restoring unit may be selected. The spring stiffness is, therefore, altogether lower in comparison to a variant of embodiment without gearing. The restoring force here, depending on the type of application, is preferably in the range between 40 N and 250 N and is preferably at least almost constant across the entire readjustment path.

In an expedient refinement, the connection element per se is elastic and exerts the elastic restoring force. The entire connection element is thus elastically elongatable. The connection element here is configured in the fashion of a rubber band, for example. In particular, the connection element has a linear tension characteristic, that is to say that the exerted restoring force increases so as to be proportional to elongation.

The deflection element here is preferably a deflection roller which is mounted so as to keep the friction forces for the deflection of the connection element as low as possible.

In a preferred refinement, at least one further deflection element, in particular likewise a deflection roller, is disposed, wherein the connection element is guided around the plurality of deflection elements. On account of multiple deflection, the gearing ratio between the readjustment path of the at least one line and the readjustment path of the connection element is further increased.

Expediently, a further flexural strand-shaped connection element is disposed so as to be parallel with the first connection element. This measure also serves for improved adaptation of the restoring force. In the case of centralized guiding of the slider element, the two connection elements are preferably disposed on both sides of the slider element, such that a uniform momentum-free transmission of the restoring force to the slider element is implemented.

Expediently, the slider element per se is mounted in a guide rail so as to be longitudinally displaceable. The guide rail here is part of the guide unit and is connected thereto, or is molded thereon. In order for guiding with as little friction as possible to be provided, the slider element here is mounted by way of a roller bearing unit. To this end, the roller bearing unit expediently has a cage with roller bearings, wherein the cage is guided within the guide rail so as to be longitudinally displaceable, and the slider element in turn is guided in or on the cage so as to be longitudinally displaceable. The guide rail here is disposed in particular so as to be centric on the guide unit, and there are precisely two connection elements disposed which run parallel with the centric guide rail. At least one deflection roller is assigned to each connection element here.

The connection element by way of one end is generally fastened to a fixing point, in particular on the guide unit. The bias load can be adjusted so as to be suitable for the respective type of application by way of positioning the fixing point and/or selecting the spring rate of the elastic restoring unit. The fixing point here is expediently readjustable for adjusting the bias load of the elastic restoring unit. On account thereof, there is the potential for achieving the best possible adjustment on site, that is to say during fitting to the industrial robot. To this end, various fastening possibilities for the fixing element have been expediently prepared on the guide unit, for example in the form of a plurality of individual bores or in the form of an elongate hole within which the fixing element is readjustable, etc.

Expediently, the guide unit furthermore has a base plate to which the guide rail is fastened. Preferably, the base plate furthermore is configured as a fitting plate for fitting onto a robotic arm. As such, the base plate expediently has bores by way of which fastening is enabled in a direct or else in an indirect manner on a robotic arm.

Expediently, a guide clamp is fastened to the guide unit, and specifically in a positionally fixed manner, in contrast to the slider element. Through this guide clamp, the line, that is to say the hose pack, in the fitted state is guided so as to be displaceable in a sliding manner.

According to an alternative variant of embodiment, the connection element is connected to an elastic restoring element by way of which the restoring force is exerted. Preferably, this restoring element is a helical spring unit. In this case too, the readjustment path of this helical spring unit is suitably lengthened by way of the lengthened path of the connection element. The connection element per se in this case has no or only a slight capability for elongation. The connection element is configured as a rope, for example.

In an expedient refinement, a noncircular or eccentrically mounted rotary element is disposed around which the connection element is guided and by way of which it is fastened, such that movement of the connection element leads to a rotation movement of the rotary element. The noncircular embodiment or the eccentric mounting of the latter leads to a variation of a lever arm between an engagement point of the connection element and a center of rotation of the rotary element. The variation here is adjusted in such a manner that a restoring force acting on the slider element is at least substantially constant, independent of the current position of the slider element.

According to a preferred embodiment, the guide unit furthermore is configured so as to be curved. The entire hose pack with the aid of the device is therefore guided along a predefined curved motion track. This is of particular advantage in some fields of application, for example in medical engineering, in which the hose pack is to be guided in a defined fashion along a curved track.

In particular in the case of a design of this type, the deflection element is mounted in an articulated manner on the guide unit, for example by way of a ball joint. On account thereof, the deflection element by way of its orientation is adjusted in an optimal manner to the respective conditions of the guide of the connection element.

Furthermore, the object is achieved by an articulated-arm robot having a device of this type. In the case of a multi-axis industrial robot, in particular on a robotic arm, the device here is fastened so as to follow the so-called axis 3 in the direction of a robotic hand, and expediently so in the rear region of the robotic arm, that is to say close to the axis 3.

With the above and other objects in view there is also provided, in accordance with the invention, a device for guiding at least one line of an articulated-arm robot, the device comprising:

a housing formed with two slot-shaped openings lying opposite one another and extending in a longitudinal direction;

a restoring mechanism for exerting an elastic restoring force on the line, the restoring mechanism being encapsulated in the housing and including a slider element;

a fastening element for connecting the line to the slider element of the restoring mechanism in the housing, the fastening element being a bracket formed with two bracket arms lying opposite one another and each connected through a respective the opening to the slider element in the housing.

Finally, there is also provided, in accordance with the invention, a device for guiding at least one line of an articulated-arm robot which comprises:

a housing formed with a base plate and a housing cover completely covering the base plate;

a restoring mechanism for exerting an elastic restoring force on the line, the restoring mechanism including a slider element mounted on the base plate and being completely covered by the housing cover;

the housing being formed with at least one slot-shaped opening extending in a longitudinal direction; and a fastening element connecting the line to the slider element of the restoring mechanism through the slot-shaped opening in the housing.

Other features which are considered as characteristic for the invention are set forth in the appended claims.

Although the invention is illustrated and described herein as embodied in a device for guiding at least one line of an articulated-arm robot, and articulated-arm robot, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Structurally or functionally equivalent parts and elements are provided with identical reference signs in the figures.

DETAILED DESCRIPTION OF THE INVENTION

Figure 1A:
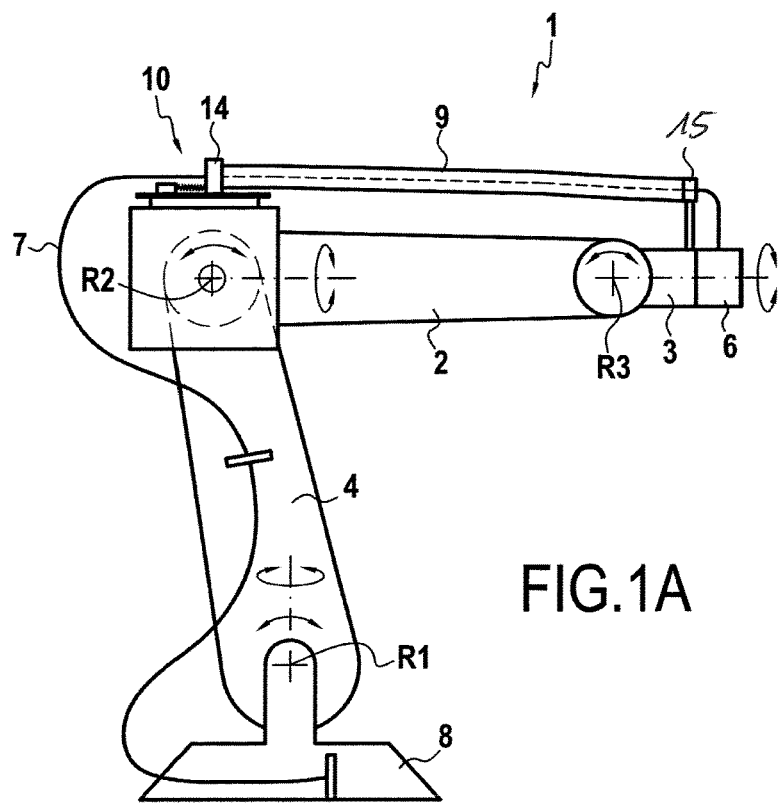
FIG. 1A in a schematic illustration shows an industrial robot having a device for guiding a hose pack, wherein the hose pack is located in a retracted starting position.
Figure 1B:
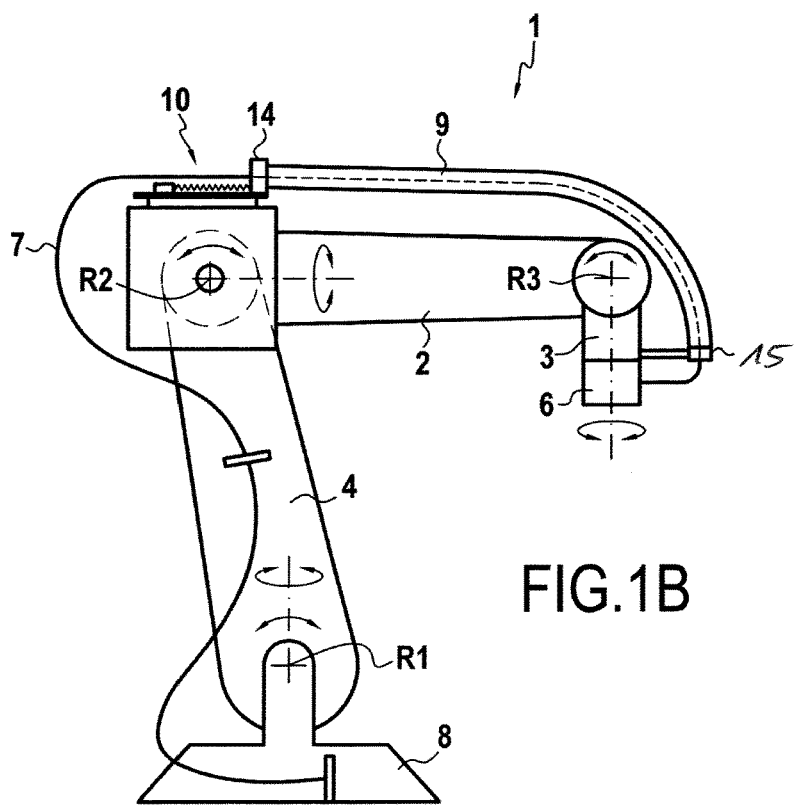
FIG. 1B shows a schematic illustration of the industrial robot according to FIG. 1A, wherein the hose pack is located in a completely extended position.

Referring now to the figures of the drawing in detail and first, particularly, to FIGS. 1A and 1B thereof, there is shown an articulated-arm robot in two different positions. This articulated-arm robot 1 is a multi-axis industrial robot, for example, in particular a six-axis industrial robot or else a medical robot. Said robot has a base 8, a first segment which is also referred to as a swing arm 4 which is connected by way of a first articulated joint R1 to the base 8. The swing arm 4 is pivotable about a horizontal axis about this first articulated joint R1. Complementary thereto, the swing arm 4 is usually pivotable about a vertical axis in relation to the base 8. The swing arm 4 extends upward in approximately the vertical direction. A second segment, generally referred to as a robotic arm 2, is connected at a second articulated joint R2 to the swing arm 4, so as to be pivotable about a so-called "axis 3." Finally, as a third segment, a robotic hand 3 is connected by way of a third articulated joint R3 to the second segment 2. Finally, a processing tool 6, such as a welding clamp, etc., for example, is attached to the robotic hand 3. An industrial robot 1 of this type in total has six different freedoms of movement.

In order for the processing tool 6 to be supplied with electricity and/or fluids and/or data signals, the industrial robot 1 has a supply-line pack 7 which is guided along the robotic arm 2 and from there is connected to the base 8. The supply-line pack 7 in the region of the robotic arm 2 is guided in a protective hose. The supply-line pack 7, together with the protective hose, in the following is also referred to as a hose pack 9. A separation point for the supply-line pack 7 is often disposed in the region of the second articulated joint, and the hose pack 9 is guided to this separation point as an interchangeable wear item.

As can be derived from FIG. 1B, during a rotation movement about the third articulation axis R3 a traction motion is exerted on the hose pack. During the reversed movement back into the starting position according to FIG. 1, the hose pack has to be pulled back again into the starting position.

To this end, a device 10 for guiding and for retrieving the hose pack 9 is fastened in the region of the second articulated joint R2 on the robotic arm 2. This is illustrated only in a very simplified manner in FIGS. 1A, 1B. A fastening clamp 14 in which the hose pack 9 is securely held, in particular in a form-fitting manner, such that a restoring force which is exerted by the device is transmitted to the hose pack 9, belongs to this device 10.

The hose pack 9, at its forward end which is oriented toward the robotic hand 3, is additionally fixed by way of a further fastening clamp 15, such that the hose pack 9 is held in a tensioned manner between the two fastening clamps 14, 15. In the exemplary embodiment, the hose pack 9 extends between these two fastening clamps 14, 15, and thus ends thereon. The individual lines, or the supply-line pack 7, respectively, exit(s) from the protective hose at these positions.

A first variant of embodiment of the device 10 is illustrated in FIGS. 2 to 6.

The device 10 comprises a housing 16 which has a housing cover 18 and a base plate 20. In the exemplary embodiment, the housing 16 has two longitudinal slots 22 which lie opposite one another and which extend in the longitudinal direction z of the device. The longitudinal direction z at the same time also corresponds to the longitudinal direction of the hose pack 9.

The fastening clamp 14 is fastened on a bracket 24 which is approximately shaped as a U-arm or a C-arm; the bracket 24 here runs along the upper side of the housing cover 18 and has two bracket arms 26 which in the exemplary embodiment are connected to laterally projecting lateral flanges of a slider element 28. As will be explained in even more detail later, the bracket 24, together with the fastening point 14, is mounted so as to be displaceable along the longitudinal slots 22. The bracket 24 in the exemplary embodiment, together with the fastening clamp 14, forms a fastening element on which the hose pack 9 is held.

A guide clamp 30, having a guide insert 32 which in both directions widens approximately like a trumpet, is disposed at that end of the device 10 that lies opposite the fastening clamp 14. In the fitted state, the hose pack 9 is guided so as to be displaceable in a sliding manner within this guide insert 32. By contrast, the hose pack 9 is fixed in a locationally (i.e., positionally) fixed manner in the fastening clamp 14, in particular by way of a form-fit. To this end, the fastening clamp 14 is configured so as to have, in particular, an inner annular groove in which a corresponding annular web of the hose pack 9 engages. The fastening clamp 14 and/or the guide clamp 30, in a variant which is not illustrated in more detail here, are configured in such a manner that the hose pack 9 can perform a tilting movement in relation to the longitudinal direction 23. As can be seen from the figures, both clamps 14, 30 are configured from two half-shells which are interconnected by way of connection elements (screws). On account thereof, simple interchanging of the hose pack 9 is enabled.

A restoring mechanism 40, which comprises the already mentioned slider element 28, a guide rail 42, first deflection rollers 44 and an elastic rope-type connection element 46, is configured in the interior of the housing 16. A guide unit for guiding the hose pack 9 is formed by the guide rail 42, together with the base plate 20. In the fitted state, this guide unit is fixed, for example screwed, to the industrial robot 1. The connection element 46 is an elastic rope, an elastic tape, or another elastic flexural element, for example. The one end of the connection element 46 is fastened to a fixing element 48 which is held in a positionally fixed manner on the base plate 20 which is likewise part of the restoring mechanism 40. The other end of the connection element 46 is fastened to the slider element 28. However, prior thereto the connection element 46 is guided around the first deflection roller 44 which is substantially fastened to the base plate 20 at the opposite end thereof.

In total two connection elements 46 which are in each case disposed and configured so as to be mutually symmetrical in relation to a central longitudinal axis of the device 10 are disposed in the exemplary embodiment, such that a uniform application of force on the slider element 28 results. The ends of the two connection elements 46 engage on laterally projecting arms of the slider element 28. The two connection elements 46 here run on both sides of the centrically located guide rail 42.

Within the guide rail 42, the slider element 28 is mounted, in particular mounted with ball bearings, with the aid of a friction element 50. As can be derived in particular from FIG. 6, the friction element 50 is displaceably disposed within a cage 52, wherein the cage 52 receives a plurality of roller bodies, in particular balls 54. The cage 52 per se, together with the balls 54, in turn is displaceably mounted within the guide rail 42. The cage 52 extends across approximately half of the length of the guide rail 42. The friction element 50, which is configured in the fashion of a sliding block, is part of the slider element 28. Above the guide rail 42, the slider element 28 is configured so as to be plate-like. The friction element 50 here is preferably fastened to this plate by way of a plurality of screws.

Figure 3:
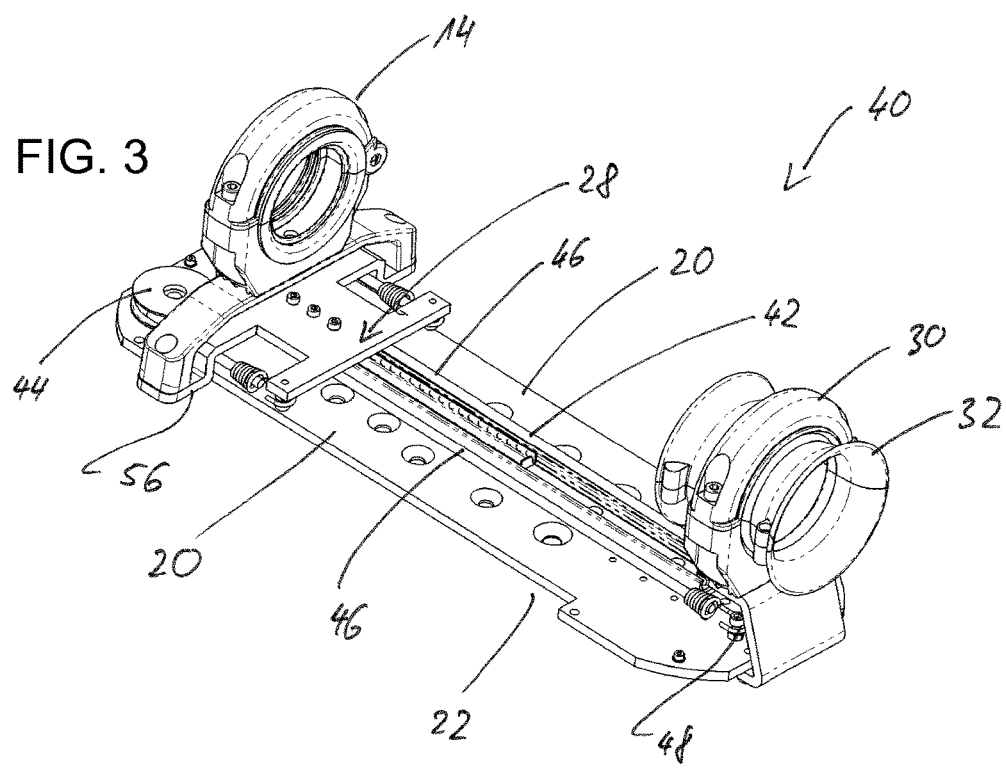
FIG. 3 shows a restoring mechanism in a perspective illustration of the device illustrated in FIG. 2.

As can be derived in particular from FIG. 3, the fastening plate 20 has lugs which are angulated in a laterally downward manner and which form in approximately one step and have end-side lugs 56 to which the bracket 24 is fastened. The lugs 26 here are routed down to approximately the level of the base plate 20 and are routed to the outside through the longitudinal slots 22. The longitudinal slots 22 are configured by rebounds in the base plate 20.

Figure 4:
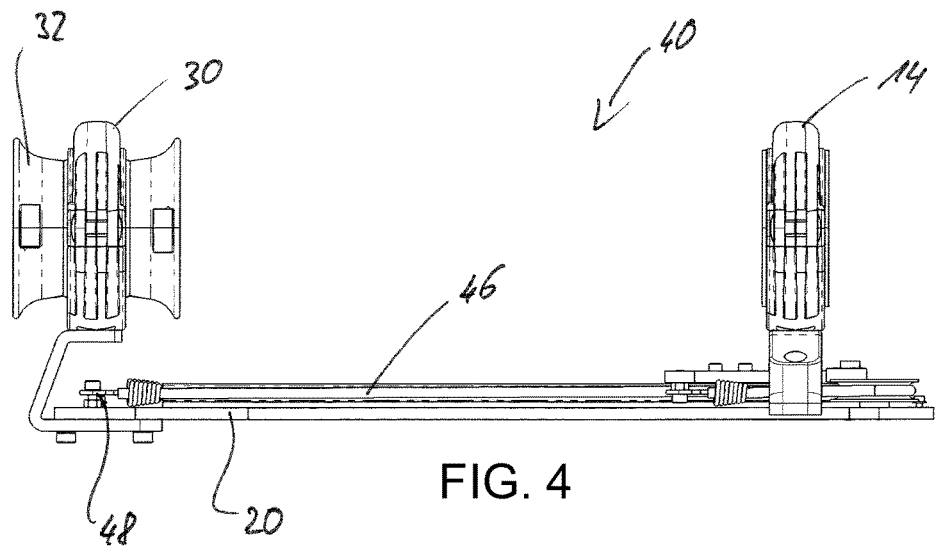
FIG. 4 shows a side view of the restoring mechanism illustrated in FIG. 3.

As can be furthermore derived from FIG. 4, the guide clamp 30 is connected to the base plate 20 in the end region of the base plate 20 in which the fixing element 48 is also fastened. A plurality of fastening holes 58, by way of which fastening of the entire device 10 to the industrial robot 1 is performed, are configured in the base plate 20. On account of the plurality of fastening holes 58, the device 10 here can be adapted to various industrial robots 1 having different hole groupings or else be disposed at varying positions. The base plate 20 therefore at the same time defines a fitting plate.

Figure 7:
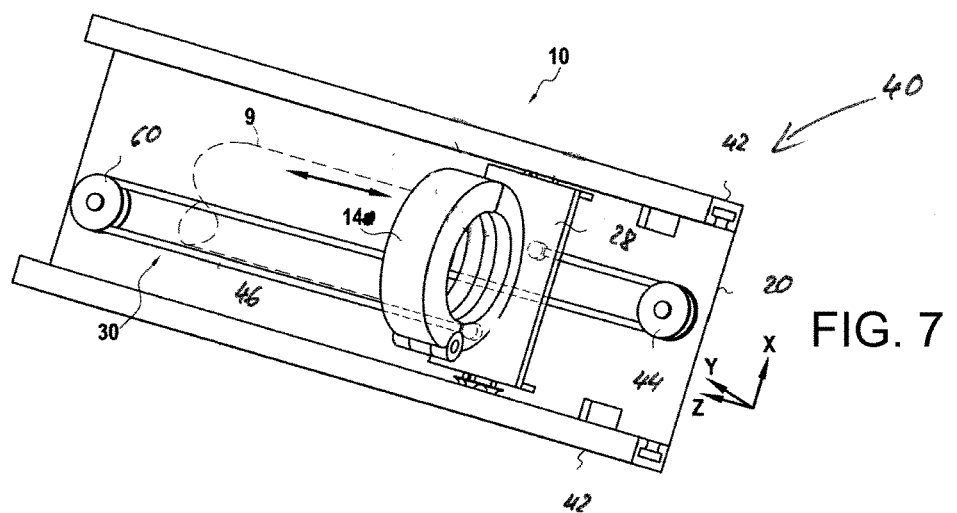
FIG. 7 shows a perspective plan view of a restoring mechanism of a second variant of embodiment.
Figure 8:
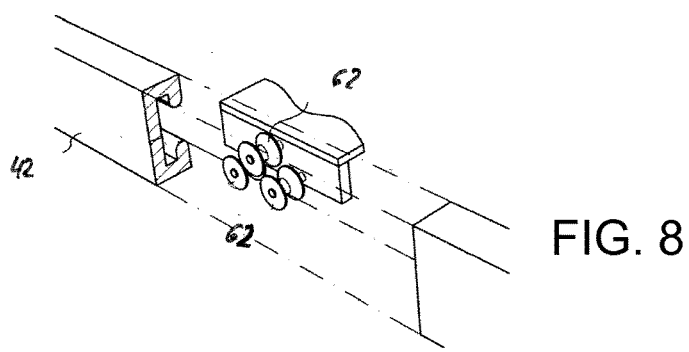
FIG. 8 shows a partial illustration of a further variant of embodiment of a guide rail of the restoring mechanism.

FIG. 7 shows an alternative variant of embodiment of the restoring mechanism 40 which in terms of the functional principle is comparable to the first variant of embodiment. In contrast thereto, a second deflection roller 60 is now fastened to the base plate 20, such that the two deflection rollers 44, 60 are disposed on ends of the base plate 20 which lie opposite one another and the elastic connection element 46 is deflected twice. Instead of the centric positioning, two peripheral guide rails 42 are now configured, such that the base plate 20, together with these guide rails 42, forms an approximately U-shaped guide unit when viewed in the cross section. The slider element 28 is mounted on both sides in the two guide rails 42. As can be derived from FIG. 8, mounting is performed here in particular with the aid of track rollers 62 which travel along in the guide rail 42. The guide rail 42 here is configured so as to be approximately a C-profile, and in total three track rollers 62, which are supported in an upward manner, on the one hand, and in a downward manner on the C-profile, are disposed. The longitudinal direction corresponds to the direction z which is indicated in the figure. The fastening clamps 14 of all variants of embodiment described here are preferably slightly tiltable in the direction x and/or direction y.

Figure 9:
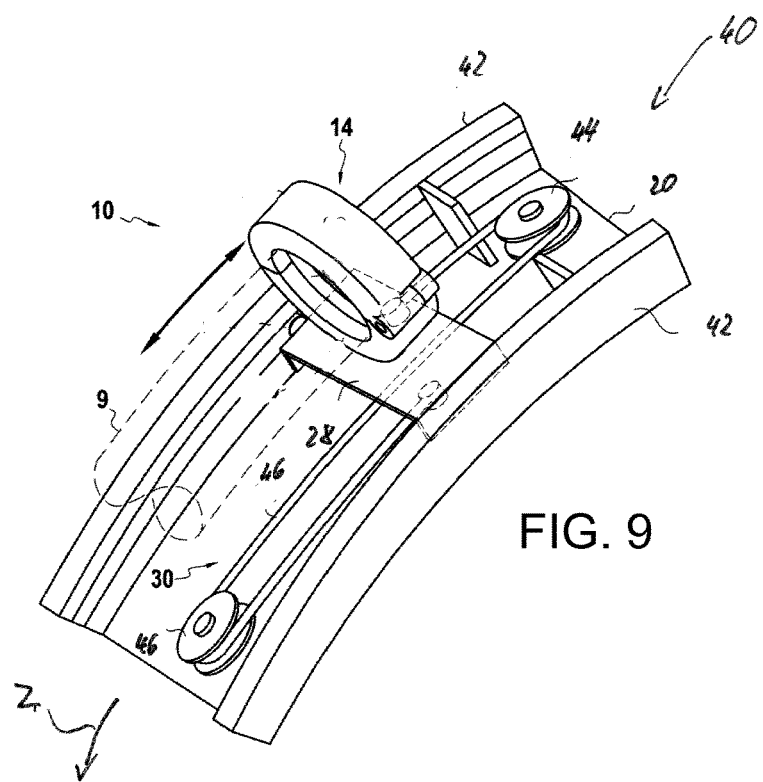
FIG. 9 shows a third variant of embodiment of the restoring mechanism in a perspective illustration.

A modified variant of embodiment of the restoring mechanism 40 according to FIG. 7 is illustrated in FIG. 9. In contrast to the variant of embodiment according to FIG. 7, the base plate 20 and thus the guide unit is now formed by the base plate 20 having the guide rails 42 configured in a curved manner, such that displacement of the fastening clamp 14 thus runs along a curved track. The deflection rollers 44, 60 here are fastened to the base plate 20 in an articulated manner, for example.

Figure 10:
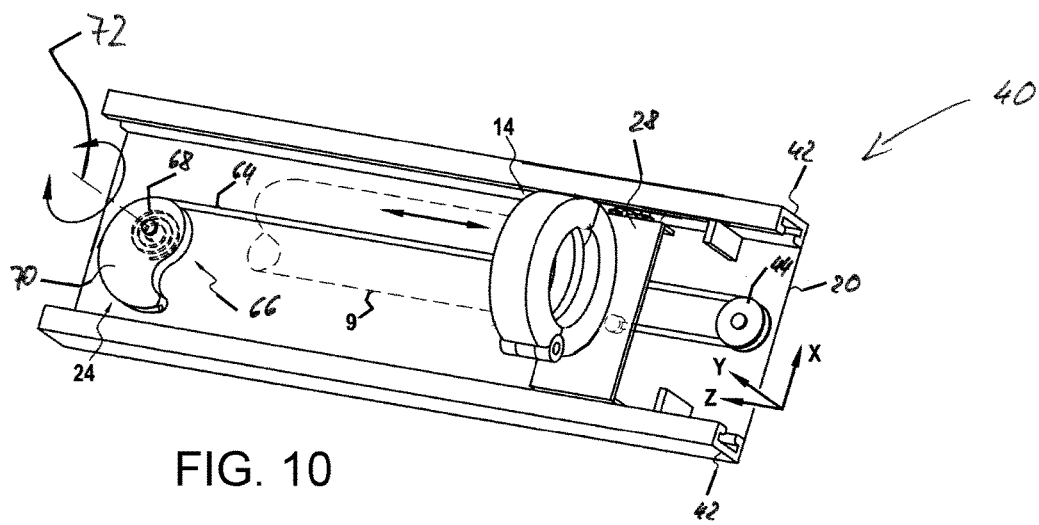
FIG. 10 shows a fourth variant of embodiment of the restoring mechanism.

Finally, an even further variant of embodiment of the restoring mechanism 40 is illustrated in FIG. 10. Said variant of embodiment also again shows peripherally disposed guide rails 42, having the slider element 28 mounted by way of the track rollers 62. While in the previous variants of embodiment the connection element 46 per se has been elastically configured, it is now configured as a non-elastic, non-elongatable connection element 64.

Here, the one end of the connection element 64 is fastened to an elastic restoring element 66. In order for the elastic restoring force to be exerted, said elastic restoring element 66 comprises a spring element which is configured in particular as a helical spring 68. Complementary thereto, the restoring element 66 further comprises a rotatably mounted rotary element 70 which is rotatable about an eccentric axle 72. The eccentric axle 72 at the same time defines the central axis of the helical spring 68. The connection element 64 is guided around the rotary element 70 in a corresponding groove and is fastened to the rotary element 70.

A lever arm is configured between the fastening point of the connection element on the rotary element 70 and the axle 72 to the extent that a momentum of force is transmitted by way of the connection element 64 to the helical spring 68. By way of its one end, the helical spring 68 is fastened to the axle 72, and by way of its other end, the helical spring 68 is fastened to the rotary element 70. Expediently, the design of the rotary element 70 is configured in such a manner that during displacement of the slider element 28 the restoring force which is exerted thereon and thus on the fastening clamp 14 remains constant. An increase of the elastic restoring force of the helical spring 68 is thus compensated for by a decrease in the lever arm by way of the rotary element 70, for example. Expediently, the restoring force which acts on the fastening clamp 14 is thus constant across the entire readjustment path of said fastening clamp 14.

Figure 2:
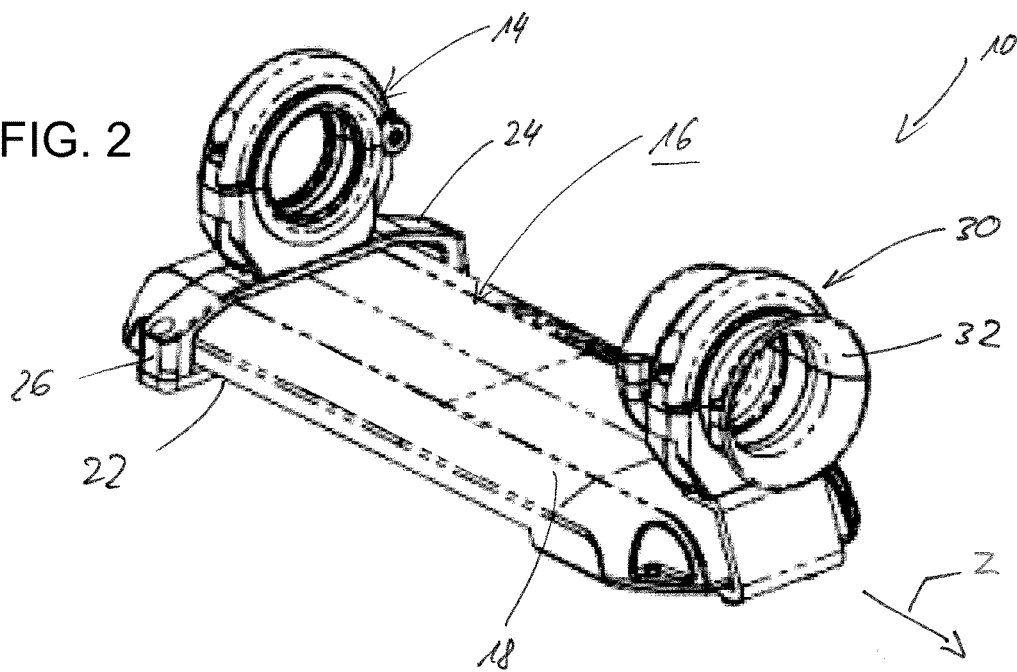
FIG. 2 shows a perspective illustration of a device for guiding a hose pack according to a first variant of embodiment.

In the variants of embodiment of the restoring mechanism having the two outboard guide rails 42, which are illustrated in FIGS. 7 to 10, a variant of embodiment which is similar to that in FIG. 2, having the housing 16, is likewise enabled. The restoring mechanisms 40 of all variants of embodiment can thus be integrated in a housing 16. Further restoring mechanisms 40, for example without deflection elements 44, 60, and for example with helical springs, may also be disposed. In contrast to the variant of embodiment of FIG. 2, the longitudinal slot 22 in this case would not be disposed laterally but on the upper side of the housing cover 18, such that the fastening clamp 14 runs above the housing cover 18.

Figure 11:
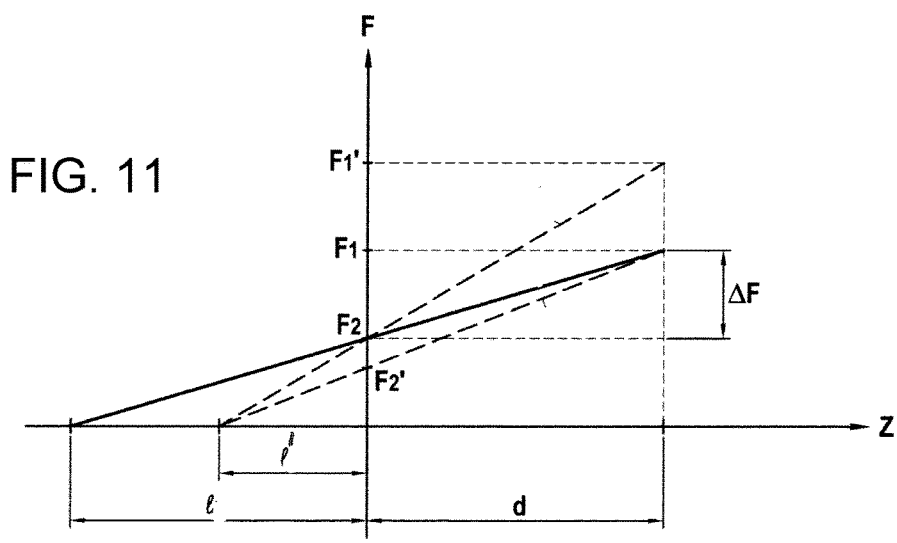
FIG. 11 shows a diagram for illustrating the profile of the restoring force.

In all variants of embodiment, the restoring mechanisms 40 are biased restoring mechanisms which thus already in the initial position, that is to say in a position z=0, exert a restoring force F (cf. coordinate system in FIG. 10 in conjunction with FIG. 11).

On account of the deflection of the connection element 46, 66, and in particular of the elastic connection element 46, the length and thus the force of the bias load can be readily adjusted, without said bias load being determined by the dimensions of the device 10.

Figure 5:
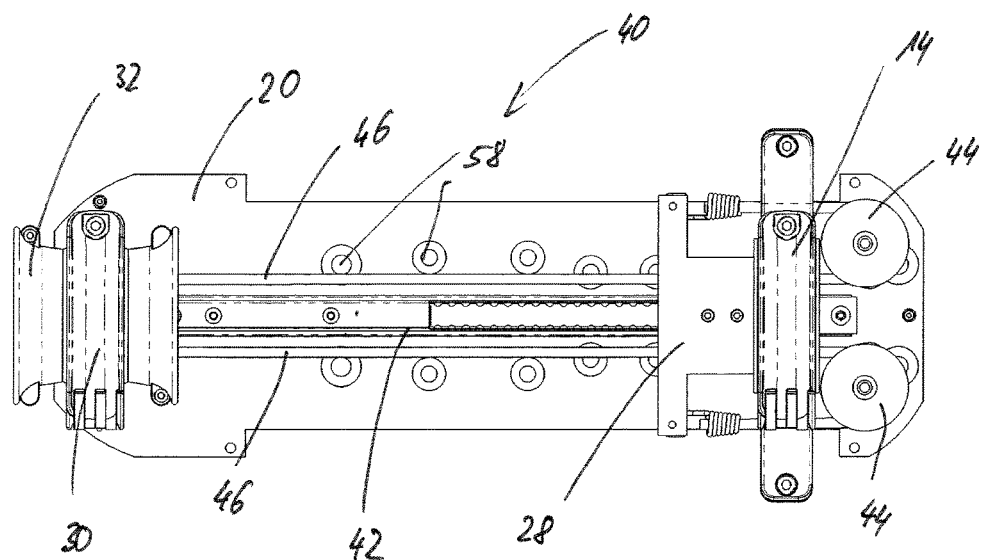
FIG. 5 shows a plan view of the restoring mechanism illustrated in FIG. 2.
Figure 6:
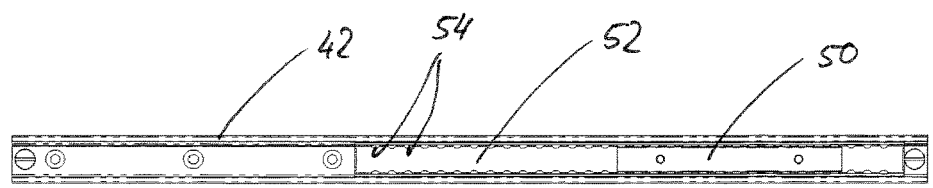
FIG. 6 shows a plan view of a guide rail of the restoring mechanism.

This situation is illustrated in FIG. 11, in which the restoring force F in relation to an elongation in the longitudinal direction z is illustrated for various situations. The position z=0 (intersection point of the two axes of the coordinate system) here defines a bias force F2. The restoring force of the elastic restoring unit is linear, such that the force F increases linearly according to a spring rate which is predefined by the elastic restoring unit, as the elongation in the longitudinal direction z increases. The maximum extension length, that is to say the extension length between the retracted and the extended position, is indicated by d in FIG. 11. In the extended position a restoring force F1 is achieved. The variation potential of the length adjustment, in particular for the connection element 46, 66, which is defined by the deflection rollers 44, 60 and a readjustment potential of the fixing element 48, is illustrated on the negative axis z. The length of the connection element 46, 66 in the non-extended initial position is illustrated in FIG. 5 as the bias length l. In the case of an only small bias length l', a comparatively high spring rate, that is to say a high pitch, is required in order to achieve the desired bias load F2. However, during further extension, that is to say during offset of the fastening clamp 14 in the longitudinal direction z, this leads to a sharp increase in the restoring force F, such that in the exemplary embodiment of FIG. 11a (too) high restoring force F1' would be achieved in the extended position. However, a decrease in the spring rate, such that only a desired restoring force F1 is achieved, would lead to an excessively low bias force F2' in the retracted position.

By contrast thereto, if a longer bias length l is adjusted, the same bias load F2 is already achieved at a significantly lower pitch and thus lower spring rate, such that the increase in force $\Delta F = F1-F2$ across the readjustment path d is significantly lower and the desired restoring force F1 is finally achieved.

Overall, by way of this measure, that is to say by adjusting the bias length l, the bias force F2 as well as the restoring force F1 at the end of the displacement path d can therefore be suitably adjusted. In the same way, the bias force F2 to restoring force F1 ratio and thus the increase in force ΔF is also adjusted. By way of the deflection of the connection element 46, 66, a defined bias load having a bias force F2 can also be suitably adjusted in the case of a short construction length of the device 10. The connection element 46 per se is configured in particular as an elastic element for exerting the restoring force.

The invention claimed is:

1. A device for guiding a line of an articulated-arm robot, comprising:
    a restoring mechanism for exerting a restoring force on the line, said restoring mechanism having a guide unit and a slider element displaceably held on said guide unit between a first position and a second position, and having a restoring unit disposed so as to be effective between said guide unit and said slider element and configured to exert a restoring force on said slider element;
    said restoring unit having at least one deflection element being a mounted deflection roller and a flexural strand-shaped connection element guided around said deflection element and connected to said slider element.

2. The device according to claim 1, wherein said connection element is elastic and exerts the restoring force.

3. The device according to claim 1, wherein said at least one deflection element is one of a plurality of deflection elements and said connection element is guided around said plurality of deflection elements.

4. The device according to claim 1, wherein said connection element is a first connection element and wherein a further flexural and strand-shaped connection element is guided in parallel with said first connection element.

5. The device according to claim 1, wherein the guide unit comprises a guide rail supporting said slider element so as to be longitudinally displaceable.

6. The device according to claim 1, which comprises a roller bearing unit mounting said slider element.

7. The device according to claim 1, wherein said connection element has one end fastened to an adjustable fixing element for adjusting and readjusting a bias load.

8. The device according to claim 1, wherein said guide unit comprises a base plate and a guide rail fastened to said base plate.

9. The device according to claim 8, wherein said guide rail centrally fastened to said base plate and said guide unit is a fitting plate for fitting onto a robotic arm.

10. The device according to claim 1, which comprises a guide clamp, through which said line, in a fitted state thereof, is guided so as to be slidingly displaceable, and said guide clamp is fastened in a positionally fixed manner to said guide unit.

11. The device according to claim 1, which comprises an elastic restoring element connected to said strand-shaped connection element.

12. The device according to claim 11, wherein said strand-shaped connection element is guided around a noncircular or eccentrically mounted rotary element, and is fastened thereto, whereupon a movement of said connection element leads to a rotation movement of said rotary element and, on account of the noncircular embodiment or the eccentric mounting thereof, to a variation of a lever arm.

13. The device according to claim 1, wherein said guide unit is curved and wherein said deflection element is articulated on said guide unit.

14. A device for guiding at a line of an articulated-arm robot, the device comprising:
    a housing formed with two slot-shaped openings lying opposite one another and extending in a longitudinal direction;
    a restoring mechanism for exerting an elastic restoring force on the line, said restoring mechanism being encapsulated in said housing, said restoring mechanism including a slider element displaceable with the line and being encapsulated in said housing;
    a fastening element for connecting the line to said slider element of said restoring mechanism in said housing, said fastening element being a bracket formed with two bracket arms lying opposite one another and each connected through a respective said opening to said slider element in said housing.

15. The device according to claim 14, wherein said housing has a base plate and a housing cover completely covering said base plate, and wherein said restoring mechanism is attached to said base plate.

16. The device according to claim 14, wherein said fastening element has a fastening clamp for fixing the line outside said housing.

17. A device for guiding a line of an articulated-arm robot, the device comprising:
    a housing formed with a base plate and a housing cover completely covering said base plate;
    a restoring mechanism for exerting an elastic restoring force on the line, said restoring mechanism including a slider element mounted on said base plate and being completely covered by said housing cover;
    said housing being formed with at least one slot-shaped opening extending in a longitudinal direction; and
    a fastening clamp disposed outside of said housing, said fastening clamp clamping the line and connecting the line to said slider element of said restoring mechanism through said slot-shaped opening in said housing.

18. The device according to claim 17, wherein said slot-shaped opening is one of two openings formed opposite one another and said fastening element for connecting the line to said slider element is a bracket formed with two bracket arms lying opposite one another and each connected through a respective said opening to said slider element in said housing.

19. An industrial articulated-arm robot, comprising the device according to claim 1 configured for guiding a hose pack of the robot.

* * * * *

EX PARTE REEXAMINATION CERTIFICATE (11436th)

United States Patent
Burlot

(10) Number: US 10,059,011 C1
(45) Certificate Issued: Dec. 26, 2018

(54) DEVICE FOR GUIDING AT LEAST ONE LINE OF AN ARTICULATED-ARM ROBOT, AND ARTICULATED ARM ROBOT

(71) Applicant: LEONI KABEL HOLDING GMBH, Nuremberg (DE)

(72) Inventor: Claude Burlot, Bullion (FR)

(73) Assignee: LEONI KABEL HOLDING GMBH, Nuremberg (DE)

Reexamination Request:
No. 90/014,207, Sep. 25, 2018

Reexamination Certificate for:
Patent No.: 10,059,011
Issued: Aug. 28, 2018
Appl. No.: 14/803,715
Filed: Jul. 20, 2015

Related U.S. Application Data

(63) Continuation of application No. PCT/EP2014/050869, filed on Jan. 17, 2014.

(60) Provisional application No. 61/754,214, filed on Jan. 18, 2013.

(30) Foreign Application Priority Data

Jan. 18, 2013 (FR) .................................... 13 50467

(51) Int. Cl.
*B25J 19/00* (2006.01)
*H02G 11/00* (2006.01)
*H02G 3/32* (2006.01)

(52) U.S. Cl.
CPC ........ *B25J 19/0025* (2013.01); *H02G 11/003* (2013.01)

(58) Field of Classification Search
None
See application file for complete search history.

(56) References Cited

To view the complete listing of prior art documents cited during the proceeding for Reexamination Control Number 90/014,207, please refer to the USPTO's public Patent Application Information Retrieval (PAIR) system under the Display References tab.

*Primary Examiner* — Robert M Fetsuga

(57) ABSTRACT

In order for a suitable restoring force to be exerted in a device for guiding at least one line of an articulated-arm robot, a restoring mechanism for exerting an elastic restoring force is provided. The restoring mechanism includes a guide unit and a slider element which is displaceably mounted on the guide unit. An elastic restoring unit, which has at least one deflection element, which is preferably configured as a deflection roller, and a flexural strand-shaped connection element, is disposed between the slider element and the guide unit. The restoring mechanism is housed in a closed housing and the line is connected to a slider element of the restoring unit inside the housing through one or two longitudinal slots.

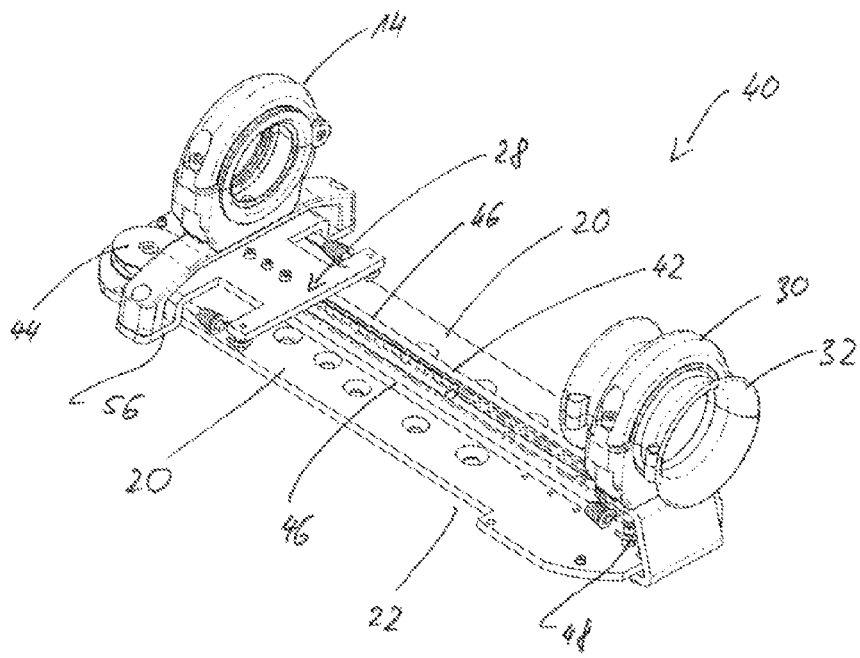

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-19 is confirmed.

\* \* \* \* \*